Aug. 6, 1940.   R. WASMUND   2,210,786
AUTOMATIC ARC WELDING
Filed Feb. 28, 1939
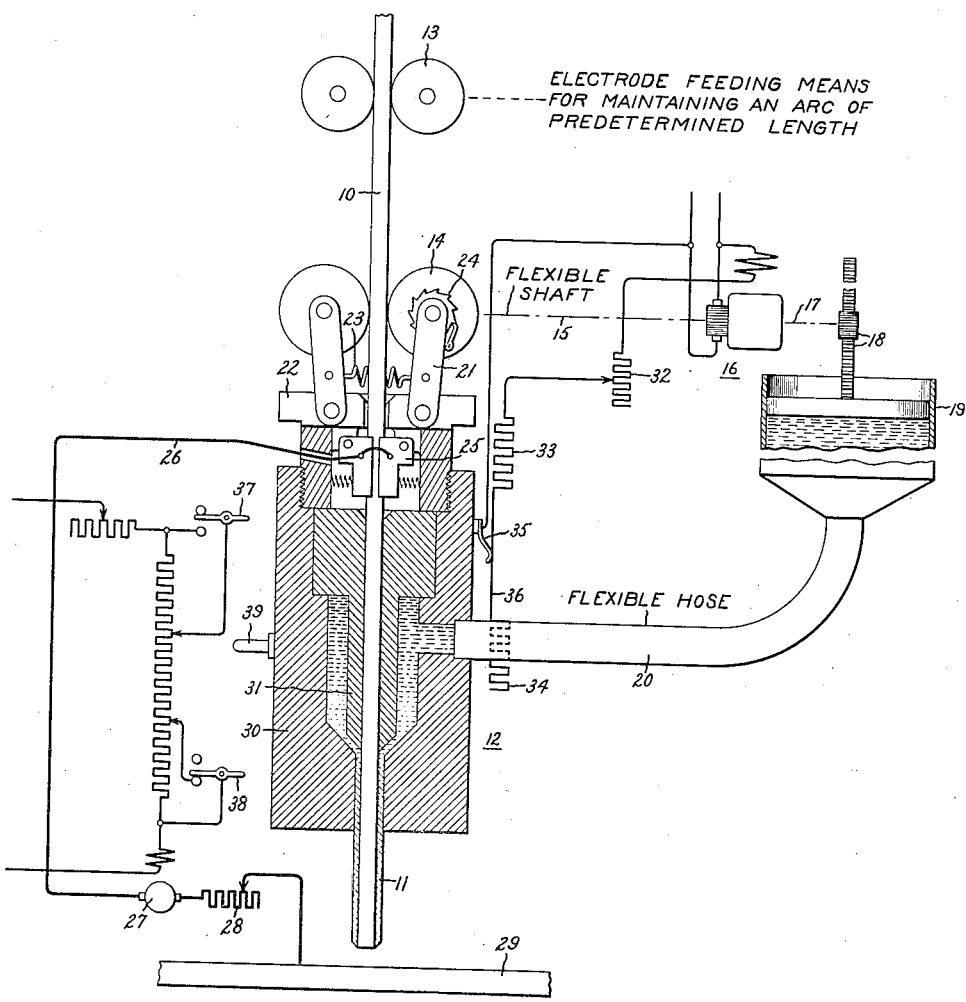
Inventor:
Reinhard Wasmund,
by Harry E. Dunham
His Attorney.

Patented Aug. 6, 1940

2,210,786

UNITED STATES PATENT OFFICE 2,210,786

AUTOMATIC ARC WELDING

Reinhard Wasmund, Frankfort-on-the-Oder, Germany, assignor to General Electric Company, a corporation of New York Application February 28, 1939, Serial No. 259,008 In Germany March 2, 1938

9 Claims. (Cl. 219—8)

My invention relates to automatic arc welding machines in which means are provided for feeding an electrode and simultaneously coating it with a suitable welding flux.

The rate at which an electrode is fed to the welding arc depends on a number of factors and is, consequently, not constant. If the rate at which flux is applied to the electrode does not vary according to the variations in the rate of electrode feed, the flux coating applied to the electrode is not uniform and this lack of uniformity may seriously affect either the behavior of the welding arc or the quality of the weld deposit or both.

It is an object of my invention to provide automatic arc welding apparatus in which means responsive to changes in the rate at which an electrode is fed by an automatic feeding means is employed for changing the rate at which flux is applied to the electrode so that a substantially uniform coating of flux is applied to the electrode.

It is a further object of my invention to provide a flux extruding nozzle which is propelled along the electrode at a substantially constant speed approximating the average speed with which the electrode is fed by the electrode feeding means and to which flux is applied at a substantially constant rate corresponding to the rate at which a uniform flux coating is applied to the electrode by said nozzle in its movement along said electrode at said substantially constant speed.

It is another object of my invention to provide means responsive to a predetermined movement of the extruding nozzle relative to the electrode feeding means for correctively adjusting the feeding speed of the nozzle and the rate at which flux is applied thereto relative to the feeding speed of the electrode.

Further objects of my invention will become apparent from a consideration of the embodiment thereof diagrammatically illustrated in the accompanying drawing.

In this drawing, the arcing terminal portion of a bare electrode 10 is provided with a flux coating 11 by means of an extrusion nozzle 12 through which it is fed. The means for feeding the electrode comprises a plurality of feed rolls 13 which are rotated at speeds suitable for maintaining a welding arc at the arcing terminal of the electrode. These feed rolls are preferably rotated in such a manner as to strike and maintain an arc of predetermined length. One arrangement for accomplishing this result is described and claimed in United States Letters Patent No. 1,931,129—V. J. Chapman and R. M. Stephens, granted October 17, 1933.

The nozzle 12 is propelled along the electrode 10 by feed rolls 14. These feed rolls are connected through a flexible shaft 15 to a motor 16 which is also connected through a shaft 17 and gearing 18 to a force pump 19 by means of which flux is supplied through a flexible hose 20 to the flux chamber in the nozzle 12. Consequently, the rate at which flux is supplied to the nozzle 12 is correlated with the rate at which the nozzle travels along the electrode.

The nozzle feeds rolls 14 are journalled in links 21 pivotally supported on a nut 22 forming part of the nozzle 12. These links are connected by a spring 23 which biases the feed rolls into engagement with the electrode 10 which extends through the nozzle 12. A ratchet and pawl 24 associated with one or both of the feed rolls prevents the nozzle 12 from moving along the electrode 10 away from the electrode feeding means under the influence of the force of gravity.

The nut 22 also provides a support for contacts 25 by means of which welding current is supplied to the electrode in its passage through the nozzle. These contacts are spring biased into engagement with the electrode and are connected through a conductor 26 to one terminal of a welding generator 27. The other terminal of this generator is connected through a stabilizing resistance 28 to the work 29.

The flux chamber in the nozzle 12 is defined by die members 30 and 31. The core die 31 is positioned and held in the outer die 30 by the nut 22 which makes a threaded engagement with the outer die 30 and forces a shouldered portion of the inner die 31 against a corresponding shouldered portion of the outer die 30.

The nozzle 12 is propelled along the electrode 10 in a direction opposite to the direction of electrode feed by the motor 16. The speed of this motor is controlled by resistances 32, 33 and 34 connected in its field circuit. Resistances 33 and 34 form part of an automatic control operated by the movement of the nozzle 12. These resistances are supported in spaced relationship in the path of movement of a contact 35 which engages them and determines by its position thereon the field strength and speed of the motor 16. The contact 35 also engages the bridging conductor 36 extending from resistance 35 to resistance 34.

The amount of welding current supplied to the electrode is also controlled by the movement of the nozzle 12 through the agency of limit switches 37 and 38 which are operated by a stop 39 attached to the nozzle. Limit switches 37 and 38 when actuated by the stop 39 increase or decrease the field strength of the generator 27 and thereby increase or decrease the amount of welding current supplied to the electrode.

The welding apparatus above described operates as follows: The electrode 10 is fed toward and away from the work 29 to strike and maintain a welding arc through the agency of feed rolls 13. When the rotation of these feed rolls is properly controlled to maintain an arc of predetermined length, the electrode is fed toward the work at variable rates of speed depending on the rate of fusion of the electrode and the surface contour of the work part. The nozzle 12 is moved along the electrode 10 by feed rolls 14 in a direction opposite to the direction of electrode feed. The speed of nozzle movement is determined by the motor 16 which is employed for propelling the feed rolls 14. The speed of this motor is adjusted through the agency of rheostat 32 so that the motor 16 moves the nozzle 12 along the electrode at a substantially constant speed approximating the average speed of electrode feed. If, however, the electrode 10 is fed for any length of time at a speed greater than the average speed for which the nozzle feeding motor 16 is set, the nozzle will move away from the feeding means toward the work until contact 35 engages resistance 34. This will decrease the field strength of the motor 16 and increase its speed until the nozzle feeding speed is equal to and opposite the electrode feeding speed. On the other hand, if the electrode feeding speed decreases below the nozzle feeding speed, the contact 35 engages resistance 33 increasing the field strength and decreasing the speed of the motor 16 until the nozzle feeding speed and the electrode feeding speed are again equal. When the speed of the nozzle feeding motor 16 increases or decreases, the rate at which flux is supplied to the nozzle 12 also increases or decreases by reason of the fact that the flux pump 19 is also actuated by this motor. Consequently, a uniform flux coating is always applied to the electrode as it passes through the nozzle 12 since the rate at which flux is applied to the nozzle varies simultaneously with the speed at which the nozzle moves along the electrode. Ordinarily, the adjustment is such that the nozzle 12 has a limited movement so that the contact 35 supported thereon moves along the bridging conductor 36 which connects the resistances 33 and 34.

The position of the nozzle 12 relative to the electrode feeding means 13 may also be controlled by controlling the amount of welding current supplied to the electrode 10 and thereby the feeding speed of the electrode feeding means. Thus, if the electrode feeding speed and the nozzle feeding speed are not substantially identical, movement of the nozzle 12 in one direction or the other will operate the limit switches 37 and 38 to increase or decrease the amount of welding current and, consequently, increase or decrease the feeding rate of the electrode 10. In this way, a further automatic control is provided for equalizing the electrode feeding speed and nozzle feeding speed so that the nozzle 12 is confined in its movement relative to the electrode feeding means.

It is apparent that many other arrangements responsive to a predetermined movement of the nozzle relative to the electrode feeding means may be provided for decreasing the difference between the operating speeds of the electrode feeding means and the nozzle feeding and flux applying means. These arrangements may be electrical, such as illustrated in the embodiment described above, or mechanical wherein movement of the nozzle controls a suitable mechanical transmission by means of which the desired speed adjustments are obtained.

It is also apparent that the means for supporting the nozzle may be varied without departing from my invention. For example, the nozzle may be counter-weighted so that its total weight is not supported on the electrode. It may also be positioned in its movement through the agency of suitable guides forming part of the welding apparatus. The motor 16 and flux pump 19 may also form an integral part of the nozzle rather than being separately supported and connected with the nozzle through a flexible shaft and flexible hose in the manner above described.

It is also apparent that other arrangements responsive to changes in the rate at which an electrode is fed by an electrode feeding means may be provided for changing the rate at which flux is supplied to the nozzle so that a substantially uniform coating of flux is applied by the nozzle to the electrode.

I intend, consequently, to cover in the appended claims all those variations and modifications that come within the true spirit and scope of my invention.

What I claim as new and desire to secure by Letters Patent of the United States is:

1. Arc welding apparatus comprising means for feeding an electrode at rates of speed suitable for maintaining an arc at the arcing terminal of said electrode, an extrusion nozzle through which said electrode extends in its passage from said feeding means, and means responsive to changes in the rate at which said electrode is fed by said feeding means for changing the rate at which flux is supplied to said nozzle so that a substantially uniform coating of flux is applied by said nozzle to said electrode.

2. Arc welding apparatus comprising means for feeding an electrode, an extrusion nozzle through which said electrode extends in its passage from said feeding means, means for propelling said nozzle along said electrode in a direction opposite to the direction in which said electrode is fed by said feeding means, and means for supplying a welding flux to said nozzle.

3. Arc welding apparatus comprising means for feeding an electrode at speeds suitable for maintaining at the arcing terminal of said electrode an arc of predetermined length, an extrusion nozzle through which said electrode extends in its passage from said feeding means, means for moving said nozzle along said electrode in a direction opposite to the direction in which said electrode is fed by said feeding means and at a substantially constant speed approximating the average speed at which said electrode is fed by said feeding means, and means for supplying flux to said nozzle at a substantially constant rate corresponding to the rate at which a uniform flux coating is applied to said electrode by said nozzle in its movement along said electrode at said substantially constant speed.

4. Arc welding apparatus comprising means for feeding an electrode at speeds suitable for maintaining at the arcing terminal of said electrode an arc of predetermined length, an extrusion nozzle through which said electrode extends in its passage from said feeding means, means for feeding said nozzle along said electrode in a direction opposite to the direction in which said electrode is fed by said electrode feeding means and at a substantially constant speed approximating the average speed at which said electrode is fed by said electrode feeding means, means for supplying flux to said nozzle at a substantially constant rate corresponding to the rate at which a uniform flux coating is applied to said electrode by said nozzle as it is fed along said electrode at said substantially constant speed, and means responsive to a predetermined movement of said nozzle relative to said electrode feeding means for decreasing the difference between the operating speeds of said electrode feeding means and said nozzle feeding means.

5. Arc welding apparatus comprising means for feeding an electrode at speeds suitable for maintaining at the arcing terminal of said electrode an arc of predetermined length, an extrusion nozzle through which said electrode extends in its passage from said feeding means, means for feeding said nozzle along said electrode in a direction opposite to the direction in which said electrode is fed by said electrode feeding means and at a speed approximating the average speed at which the electrode is fed by said electrode feeding means, means for supplying flux to said nozzle at a rate corresponding to the rate at which a uniform flux coating is applied to said electrode by said nozzle in its movement along said electrode, means for supplying welding current to said electrode before the application of flux thereto by said nozzle, and means responsive to a predetermined movement of said nozzle relative to said electrode feeding means for increasing or decreasing the amount of welding current supplied to said electrode in accordance with decreases or increases in the speed at which said electrode is fed by said electrode feeding means.

6. Arc welding apparatus comprising means for feeding an electrode at speeds suitable for maintaining at the arcing terminal of said electrode an arc of predetermined length, an extrusion nozzle through which said electrode extends in its passage from said electrode feeding means, means for feeding said nozzle along said electrode in a direction opposite to the direction in which said electrode is fed by said electrode feeding means and at a speed approximating the average speed at which said electrode is fed by said electrode feeding means, means for supplying flux to said nozzle at a rate corresponding to the rate at which a uniform flux coating is applied to said electrode by said nozzle in its movement along said electrode, and means responsive to a predetermined movement of said nozzle relative to said electrode feeding means for increasing or decreasing the speed at which said nozzle is fed along said electrode by said nozzle feeding means in accordance with increases or decreases in the speed at which said electrode is fed by said electrode feeding means.

7. Arc welding apparatus comprising means for feeding an electrode at speeds suitable for maintaining at the arcing terminal of said electrode an arc of predetermined length, an extrusion nozzle through which said electrode extends in its passage from said electrode feeding means, a feed roll mounted on said nozzle, means for forcing said feed roll into driving engagement with said electrode extending through said nozzle, means for rotating said feed roll at a substantially constant speed in a direction to propel said nozzle along said electrode in a direction opposite to and at a speed approximating the average speed at which said electrode is fed by said electrode feeding means, means operated by said feed roll rotating means for supplying flux to said nozzle at a substantially constant rate corresponding to the rate at which a uniform flux coating is applied to said electrode by said nozzle in its movement along said electrode at said substantially constant speed, means for controlling the difference between the speed at which said electrode is fed by said electrode feeding means and the speed at which said nozzle is fed along said electrode by said feed roll rotating means, and means responsive to a predetermined movement of said nozzle relative to said electrode feeding means for operating said controlling means.

8. Arc welding apparatus comprising means for feeding an electrode toward the work to be welded at speeds suitable for maintaining at the arcing terminal of said electrode an arc of predetermined length, an extrusion nozzle through which said electrode extends in its passage from said feeding means toward the work to be welded, a feed roll mounted on said nozzle, means for forcing said feed roll into driving engagement with the electrode extending through said nozzle, means for rotating said feed roll at a substantially constant speed in a direction to propel said nozzle along said electrode in a direction opposite to and at a speed approximating the average speed at which said electrode is fed by said electrode feeding means, means operated by said feed roll rotating means for supplying flux to said nozzle at a substantially constant rate corresponding to the rate at which a uniform flux coating is applied to said electrode by said nozzle in its movement along said electrode at said substantially constant speed, and means responsive to a predetermined movement of said nozzle relative to said electrode feeding means for decreasing the difference between the speed at which said electrode is fed by said electrode feeding means and the speed at which said nozzle is fed along said electrode by said feed roll rotating means.

9. Arc welding apparatus comprising means for feeding an electrode toward the work to be welded at speeds suitable for maintaining at the arcing terminal of said electrode an arc of predetermined length, an extrusion nozzle through which said electrode extends in its passage from said feeding means toward the work to be welded, means on said nozzle for supplying welding current to said electrode, a feed roll mounted on said nozzle, means for forcing said feed roll into driving engagement with said electrode extending through said nozzle, means for rotating said feed roll at a substantially constant speed in a direction to propel said nozzle along said electrode in a direction opposite to and at a speed approximating the average speed at which said electrode is fed by said electrode feeding means, means for preventing rotation of said feed roll in an opposite direction, means operated by said feed roll rotating means for supplying flux to said nozzle at a substantially constant rate corresponding to the rate at which a uniform flux coating is applied to said electrode by said nozzle in its movement along said electrode at said substantially constant speed, and means responsive to a predetermined movement of said nozzle relative to said electrode feeding means for decreasing the difference between the speed at which said electrode is fed by said electrode feeding means and the speed at which said nozzle is fed along said electrode by said feed roll rotating means.

REINHARD WASMUND.